(12) United States Patent
Imataki (10) Patent No.: US 7,337,406 B2
(45) Date of Patent: Feb. 26, 2008

(54) CREATION SUPPORTING APPARATUS AND CREATION SUPPORTING METHOD OF GRAPHICAL USER INTERFACE PROGRAM, AND RECORDING MEDIUM RECORDED WITH CREATION SUPPORTING PROGRAM

(75) Inventor: Takamoto Imataki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 696 days.

(21) Appl. No.: 09/961,734

(22) Filed: Sep. 24, 2001

(65) Prior Publication Data

US 2002/0054100 A1    May 9, 2002

Related U.S. Application Data

(63) Continuation of application No. PCT/JP99/01492, filed on Mar. 24, 1999.

(51) Int. Cl.
    *G06F 3/00*    (2006.01)
(52) U.S. Cl. .................................................. 715/762
(58) Field of Classification Search ........ 345/762–764, 345/760, 967; 715/517–526, 760, 761, 762, 715/763; 717/104–105, 107, 109
    See application file for complete search history.

(56) References Cited

U.S. PATENT DOCUMENTS 5,812,122 A * 9/1998 Ng ............................. 345/703
5,969,717 A * 10/1999 Ikemoto ..................... 345/762
6,055,369 A    4/2000 Sawahata et al. ........... 395/702
6,154,875 A * 11/2000 Tanaka et al. ............... 717/107
6,496,203 B1 * 12/2002 Beaumont et al. .......... 345/762

FOREIGN PATENT DOCUMENTS

JP    09-134282    5/1997
JP    10-307716    11/1998
JP    11-024904    1/1999

OTHER PUBLICATIONS

Nikkei Open Systems. published by Nikkei Business Publications, Nov. 15, 1997, vol. 56, pp. 231-243.
Nikkei Byte, published by Nikkei Business Publications, Jul. 22, 1997, vol. 167, pp. 370-377.
C, Magazine, by Soft Bank K.K., Mar. 1, 1997, pp. 129-135.

* cited by examiner

*Primary Examiner*—Kristine Kincaid
*Assistant Examiner*—Thanh Vu
(74) *Attorney, Agent, or Firm*—Greer, Burns & Grain, Ltd.

(57) ABSTRACT

An individual object constituting a graphical user interface (hereinafter called "GUI") related with a variable and a method in a processing program for the object; and there is generated a GUI program in which a variable referencing procedure and a variable updating procedure are added to the processing program. Thus, it is unnecessary to modify the processing program with a change in screen layout, unless new objects are added to the screen layout of GUI, thereby improving the productivity of GUI programs.

7 Claims, 8 Drawing Sheets

FIG.2

| SOURCE PROGRAM FILE NAME | ~60 |

GUI COMPONENT NAME
CLASS NAME
POSITIONAL INFORMATION
SIZE INFORMATION
COLOR INFORMATION
FRAME LINE INFORMATION
FONT INFORMATION
METHOD NAME ~62

VARIABLE NAME
GUI COMPONENT NAME ~64

FIG.3

```
class MyTest {
    public int mydata;
    public MyTest() {
        mydata = 0;
    }
    public void calc(int b) {
        mydata = mydata + b;
    }
```

File:MyTest.java

Name:bar

Class:BarMeter

Position:100, 50

Size:40, 200

BColor:0, 0, 0   FColor:255, 255, 255

Border:1, Black

Font:null

Method:calc

Variable:mydata

GUI:bar

```
class GUILayout {
    public BarMeter bar;
    MyTest test;
    public GUILayout() {
        Frame fr = new Frame();
        bar = new BarMeter;
        fr.add(bar);
        bar.setSize(40, 200);
        bar.setPosition(100, 50);
        bar.setBackground(0, 0, 0);
        bar.setForground(255, 255, 255);
        bar.addActionListener(new ActionListener() {
            public void actionPerformed(ActionEvent e) {
                test.calc(bar.get());
            }
        });
    }
}
```

FIG.11

```
class MyTest { private BarMeter bar;

public int mydata;

public MyTest() { mydata = bar.get();

mydata = 0;

bar.update(mydata);

} public void calc(int b) { mydata = bar.get();

mydata = mydata + b;

bar.update(mydata);

}

}
```

CREATION SUPPORTING APPARATUS AND CREATION SUPPORTING METHOD OF GRAPHICAL USER INTERFACE PROGRAM, AND RECORDING MEDIUM RECORDED WITH CREATION SUPPORTING PROGRAM

This application is a continuation of PCT/JP99/01492 filed on Mar. 24, 1999.

TECHNICAL FIELD

The present invention relates to a creation supporting technique for Graphical user interfaces (hereinafter called "GUI's") being a computer usage environment utilizing images, and more particularly, to a technique for improving productivity of GUI programs.

BACKGROUND ART

Recently, spread of personal computers has resulted in the increased number of computer users. Thus, in view of expediency of users utilizing various computer applications, it has become typical to improve the operability by providing such applications with GUI's being a computer usage environment utilizing images.

Creation of GUI programs is conducted by a so-called GUI builder, so as to improve the productivity of GUI programs. According to the GUI builder, each component constituting the GUI (hereinafter called "GUI component") is dragged and dropped so as to paste the component onto a screen. Thereby, generation and attribute setting of the GUI components are performed, so that a minimum program concerning a screen layout is automatically generated. Meanwhile, processing programs for the GUI component are coded such as by programmers. It is assumed here that the GUI components have been defined as objects by an object oriented language.

In conventional creation methods for GUI programs, however, since the processing programs for GUI components are coded after conducting a screen layout, there are caused problems as described in the following. Namely, since the processing programs are closely related to GUI components, if the GUI components are replaced with a modification of screen layout, the processing programs are required to be substantially changed. Further, while each GUI component is allocated with a variable for conducting such as assignment and indication, even if this variable is simply changed, the processing programs for GUI components are required to be modified. Thus, the conventional creation methods for GUI programs have been limited in terms of the improvement of productivity.

The present invention has been achieved in view of the conventional problems as described above, and it is therefore an object of the present invention to provide a technique for automatically relating GUI components with processing programs thereof so as to eliminate the necessity for modifying the processing programs with a change in GUI components, to thereby improve productivity of GUI programs.

DISCLOSURE OF THE INVENTION

To achieve the above object, as a first aspect of the present invention, there is provided a creation supporting apparatus of a graphical user interface program comprising: processing program creating means for creating a processing program for an individual object constituting a graphical user interface; screen layout creating means for creating a screen layout of the graphical user interface by arranging various objects; relating means for relating a variable and a method in the processing program, with the objects arranged in the screen layout; and program generating means for generating, based on the relation between the variable and method, and the objects, a program in which the processing program is related with the objects.

Herein, the term "object" means a "class" defined by an object oriented language such as Java (trade name), C++ (trade name) and the like, and includes Button and BarMeter, for example.

According to the above constitution, firstly a processing program for an individual object is created by the processing program creating means, in case of creating a graphical user interface program. Next, a screen layout arranged with the various objects is created by the screen layout creating means. Then, a variable and a method in the processing program are related with the objects by the relating means, and thereafter, a program in which the processing program is related with the objects, is created by the program generating means.

Thus, in creating the processing program, it is unnecessary to pay attention to the relation between the processing program and the individual object constituting the screen layout, thereby allowing improvement of productivity of the graphical user interface program. Further, in a case where the screen layout has been changed, a new program in which the processing contents have been modified, is generated by the program generating means, by relating the variable and method in the processing program with the objects again by the relating means. Thus, even when the screen layout has been changed, it is unnecessary to modify the processing program unless objects are newly added. Also from this standpoint, the productivity of graphical user interface programs can be improved.

Further, the relating means may be constituted to comprise: file name designating means for designating a file name of the processing program; extracting means for extracting a variable name and a method name from the processing program, based on the file name designated by the file name designating means; specifying means for specifying the variable name and method name extracted by the extracting means for each of the objects to be arranged in the screen layout when creating the screen layout by the screen layout creating means; and file creating means for creating a relation file described with a relation between the variable name and method name specified by the specifying means, and the objects.

According to such a constitution, the variable and method in the processing program are related with the objects arranged in the screen layout, in the following manner. Firstly, when the file name of the processing program is designated by the file name designating means, the variable name and method name are extracted from the processing program. Then, in creating the screen layout, when the variable name and method name of the processing program are specified for the objects by the specifying means, the relation file described with the relation between the variable name and method name, and the objects is created by the file creating means.

Consequently, the relation between the variable and method in the processing program, and the objects arranged in the screen layout can be made by simply conducting predetermined inputs as a series of operations in a screen layout creating work, thus avoiding complicated operations. Further, when the screen layout is made to be changed, the relation file can be updated by simply conducting the above described series of operations.

Further, the program generating means may be constituted to generate a program by inserting an object referencing procedure and an object updating procedure into the processing program, based on the relation file created by the file creating means.

According to such a constitution, since the program is generated by inserting the object referencing procedure and the object updating procedure into the processing program, the processing program itself is unchanged. Thus, when such as the processing program for the individual object is to be changed, it is enough to simply change the processing program, for example. Consequently, since it is not required to change the program itself to be actually compiled, an occurrence of bugs such as due to the un-deletion of the referencing procedure can be prevented.

In addition, the creation supporting apparatus may be constituted to further comprise layout program generating means for generating a screen layout program, based on the screen layout created by the screen layout creating means and based on the method and the objects related with each other by the relating means.

According to such a constitution, the screen layout program is also generated together with the processing program, so that the productivity of the graphical user interface program can be further improved.

Further, the layout program generating means may be constituted to insert a method execution procedure into the screen layout program.

According to such a constitution, since the method execution procedure of the objects into the screen layout program, a so-called event driven interface is automatically implemented.

As a second aspect of the present invention, there is provided a creation supporting method of a graphical user interface program, comprising: a processing program creating process for creating a processing program for an individual object constituting a graphical user interface; a screen layout creating process for creating a screen layout of the graphical user interface by arranging various objects; a relating process for relating a variable and a method in the processing program with the objects arranged in the screen layout; and a program generating process for generating, based on the relation between the variable and method, and the objects, a program in which the processing program is related with the objects.

According to such a constitution, firstly a processing program for an individual object is created by the processing program creating process, in case of creating a graphical user interface program. Next, a screen layout arranged with the various objects is created by the screen layout creating process. Then, a variable and a method in the processing program are related with the objects by the relating process, and thereafter, a program in which the processing program is related with the objects, is created by the program generating process.

Thus, in creating the processing program, it is unnecessary to pay attention to the relation between the processing program and the individual object constituting the screen layout, thereby allowing improvement of productivity of the graphical user interface program. Further, in a case where the screen layout has been changed, a new program in which the processing contents have been modified, is generated by the program generating process, by relating the variable and method in the processing program with the objects again by the relating process. Thus, even when the screen layout has been changed, it is unnecessary to modify the processing program unless objects are newly added. Also from this standpoint, the productivity of graphical user interface programs can be improved.

As a third aspect of the present invention, there is provided a recording medium recorded with a creation supporting program of a graphical user interface program for realizing: a processing program creating function for creating a processing program for an individual object constituting a graphical user interface; a screen layout creating function for creating a screen layout of the graphical user interface by arranging various objects; a relating function for relating a variable and a method in the processing program with the objects arranged in the screen layout; and a program generating function for generating, based on the relation between the variable and method, and the objects, a program in which the processing program is related with the objects.

Herein, the term "recording medium" includes those mediums capable of assuredly recording various information and also capable of reading the information recorded therein out as required, such as mobile mediums, a magnetic tape, magnetic disk, magnetic drum, IC card, CD-ROM and the like.

According to this constitution, a recording medium is recorded with a creation supporting program of a graphical user interface program for realizing: the processing program creating function, the screen layout creating function, the relating function and the program generating function. Thus, those who have obtained such a recording medium are possible to readily construct a creation supporting apparatus of a graphical user interface program according to the present invention, making use of a general computer system.

BEST MODE FOR CARRYING OUT THE INVENTION

There will be described the present invention in detail, with reference to the accompanying drawings.

Figure 1:
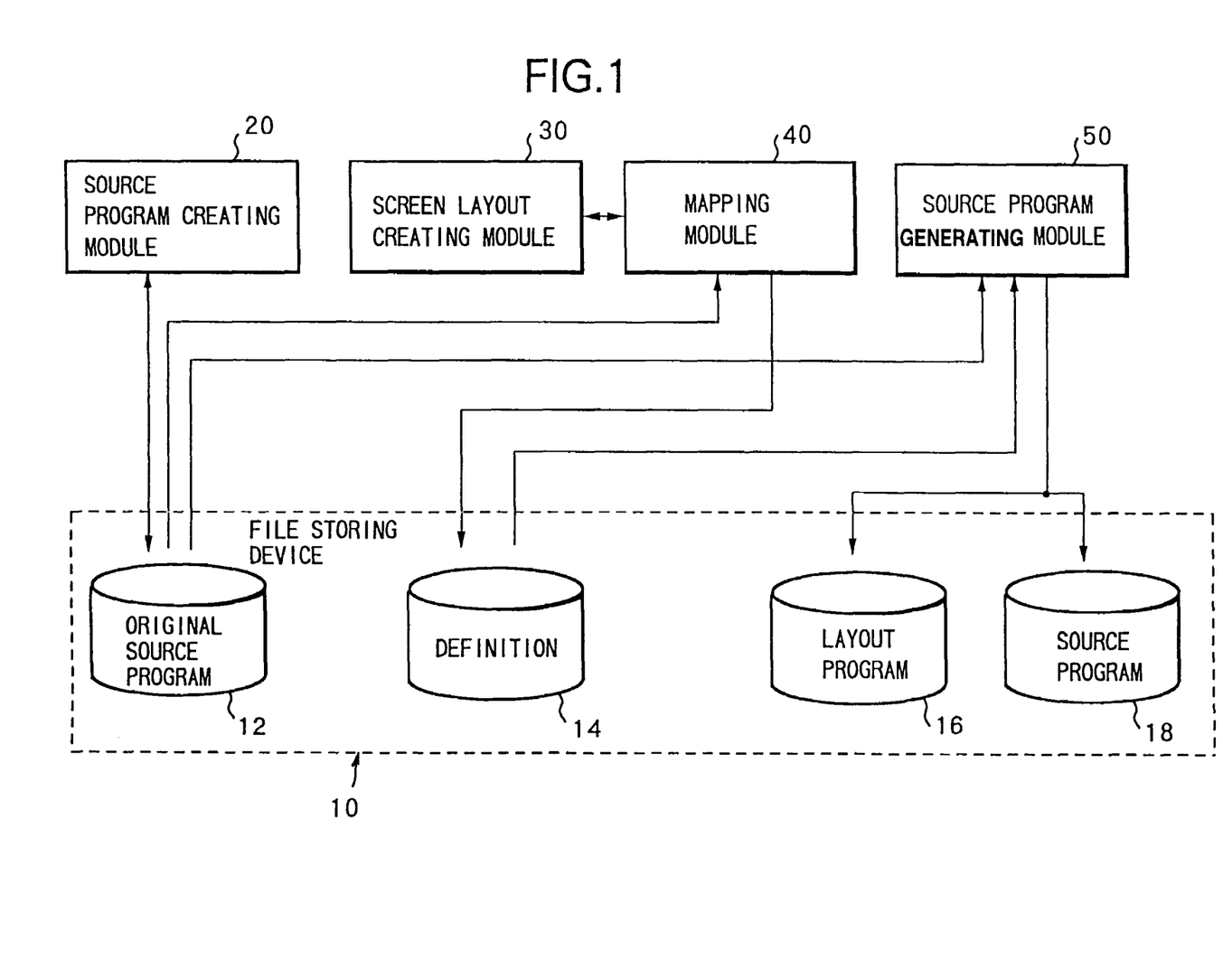
FIG. 1 is a system configuration diagram of a program creation supporting apparatus according to the present invention.

FIG. 1 shows a system configuration of a creation supporting apparatus of GUI programs according to the present invention (hereinafter called "program creation supporting apparatus"). The program creation supporting apparatus is constructed on a computer at least provided with a central processing unit and a memory so as to execute various procedures based on programs loaded onto the memory.

The program creation supporting apparatus comprises a file storing device 10, a source program creating module 20, a screen layout creating module 30, a mapping module 40 and a source program generating module 50.

The file storing device 10 is constituted of a hard disk, for example, to store therein an original source program file 12, a definition file 14 to be described later, a layout program file 16 and a source program file 18.

The source program creating module 20 is constituted of a program editor, for example, to create and edit processing programs for GUI components. Those created processing programs are stored as the original source program file 12 in the file storing device 10. Note, the source program creating module 20 acts as processing program creating means, a processing program creating process and a processing program creating function.

The screen layout creating module 30 corresponds to a so-called GUI builder, and creates a screen layout constituting GUI. Namely, a GUI component is dragged and dropped onto a screen, so that generation and attribute setting of the GUI component are performed, to thereby create a screen layout. Here, attribute of GUI component includes information specific to the GUI component, such as an arranged position, a size and a color thereof. Note, the screen layout creating module 30 acts as screen layout creating means, a screen layout creating process and a screen layout creating function.

The mapping module 40 cooperates with the screen layout creating module 30, to relate the processing program for GUI components with the GUI component in the screen layout. Namely, during the creating procedure of screen layout, an operation for relating the processing program for GUI components with the GUI component is performed, based on an input from a user; and the original source program file 12. Further, the relation result is stored as the definition file 14 in the file storing device 10. Note, the mapping module 40 acts as relating means, a relating process, a relating function, file name designating means, extracting means, specifying means and file creating means.

Figure 2:
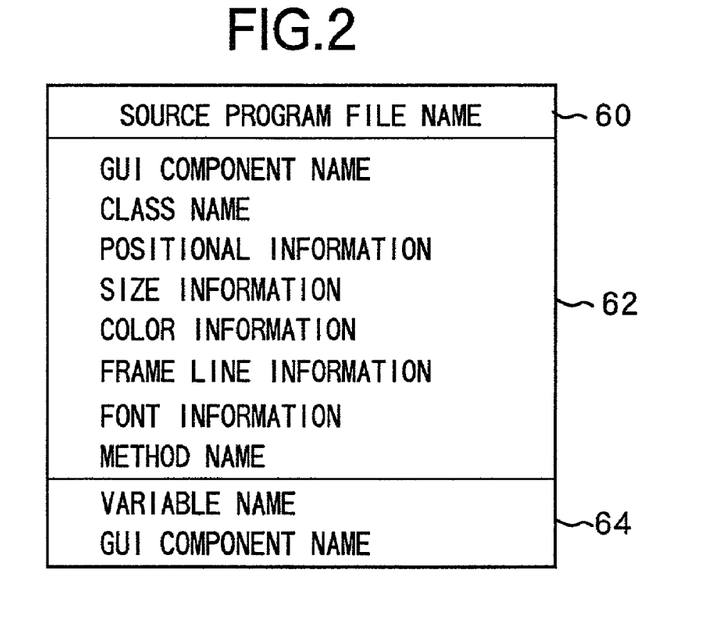
FIG. 2 is an explanatory view of a definition file.

Herein, the definition is constituted of three fields 60, 62 and 64, as shown in FIG. 2. Held in the first field 60 is a full path name for identifying the original source program file 12 described with a processing program. Held in the second field 62 is information specific to GUI component, such as a GUI component name, a class name, position information, size information, color information, frame line information, font information, and a method name. Held in the third field 64 are a variable name allocated to the GUI component, and the GUI component name.

Based on the original source program file 12 and the definition file 14, the source program generating module 50 automatically generates a layout program and a source program which are to be compiled. The thus generated layout program and source program are stored as the layout program file 16 and the source program file 18, respectively, in the file storing device 10. It should be particularly noted here that the original source program file 12 is kept unchanged. Namely, the source program to be generated by the source program generating module 50 is prepared by burying procedures for referencing and updating the GUI component into a copy of the original source program. In the above, the source program generating module 50 acts as program generating means, a program generating process, a program generating function, and layout program generating means.

Note, the source program creating module 20, screen layout creating module 30 and source program generating module 50 are activated exclusively and selectively, based on user's instructions such as via menu screen or the like. Further, the mapping module 40 is automatically activated, with the activation of the screen layout creating module 30.

There will be hereinafter described a method for creating a GUI program utilizing the program creation supporting apparatus having the aforementioned constitution, with reference to FIGS. 3 through 11. Note, in the following description, the processing program shall be described by Java (Trade name) as an object oriented language.

Figure 3:
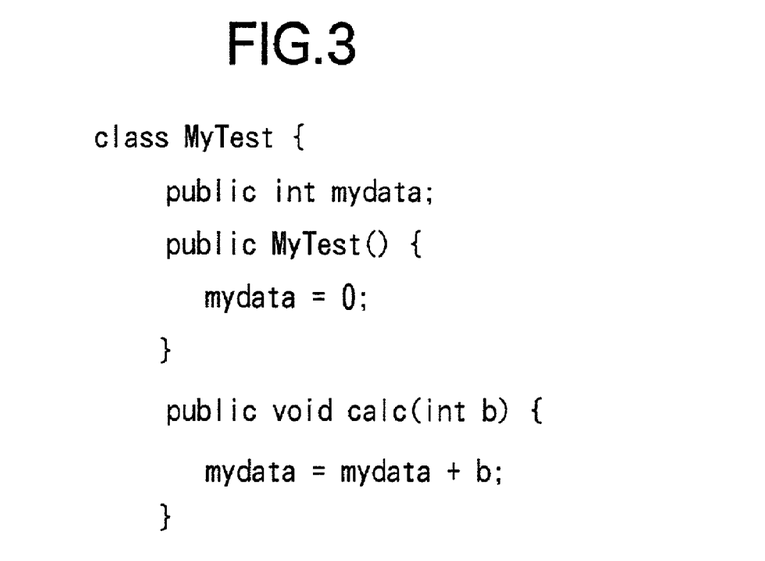
FIG. 3 is an explanatory view showing an example of a processing program.

(1) To Create a Processing Program for GUI Component:

The source program creating module 20 is activated, to thereby create an original source program described with a processing program. To be specific, a processing program as shown in FIG. 3 is described in accordance with a specification of application program, and this processing program is stored as the original source program file 12. Concerning details of the processing program shown in FIG. 3, refer to a language specification of Java, for example.

Figure 4:
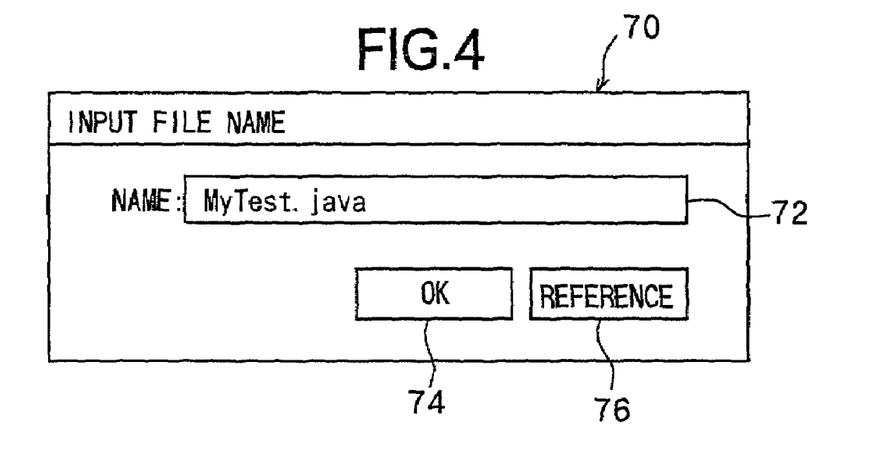
FIG. 4 is an explanatory view of a file name input screen.

(2) To Create a Screen Layout Constituted of GUI Component(s):

Upon activating the screen layout creating module 30, the mapping module 40 is activated, to display a file name input screen 70 for designating the original source program file name. The file name input screen 70 is constituted to include a file name input frame 72, an "OK" button 74 and a "Reference" button 76. To designate the original source program file name, there is the following two methods. A first method is to directly input the original source program file name into the file name input frame 72, and then to click the "OK" button 74 to thereby designate the file name. A second method is to click the "Reference" button 76 to thereby display a file list, and to select the desired original source program file from the file list. Then, since the selected original source program file name is displayed in the file name input frame 72, the "OK" button 74 is clicked to designate the file name. Note, FIG. 4 shows a situation where "MyTest.java" is input as the original source program file. The thus described series of procedures corresponds to the file name designating means.

When the original source program file name is designated, the original source program file 12 is read out from the file storing device 10, so that the variable name and the method name are extracted from the original source program file 12. The extracted variable name and method name are spread as a list, onto the memory. Note, the variable name is "mydata" and the method name is "calc", in the processing program shown in FIG. 3. Such a series of procedures corresponds to the extracting means.

Figure 5:
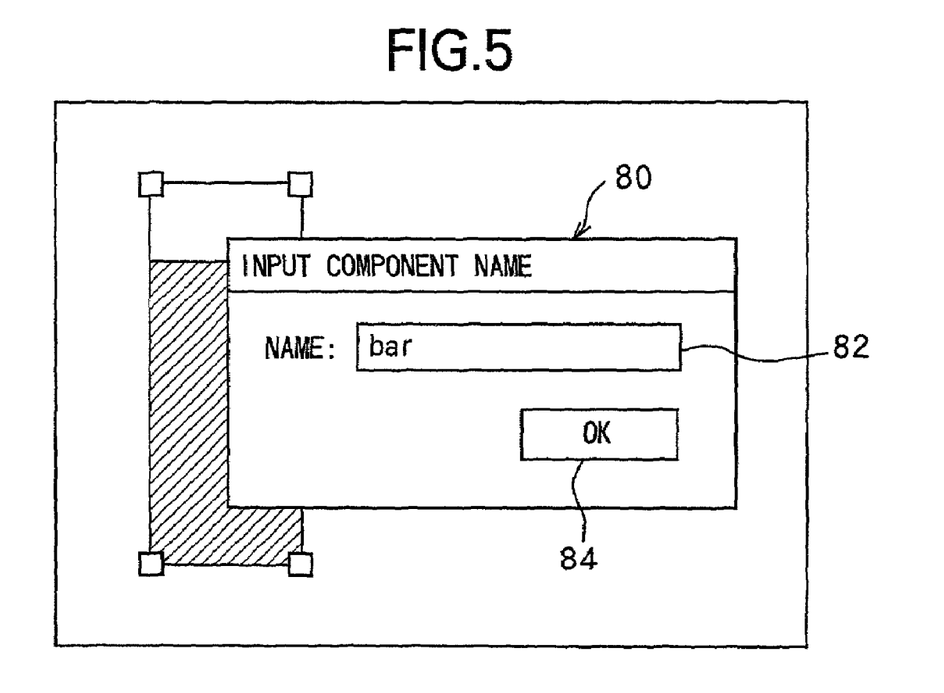
FIG. 5 is an explanatory view of a component name input screen.

When the list of the variable name and method name is created, a screen for conducting a screen layout is displayed. If, for example, "BarMeter" as GUI component is arranged by drag and drop, a component name input screen 80 for giving an arbitrary name to the GUI component is displayed, as shown in FIG. 5. The component name input screen 80 is constituted to include a component name input frame 82 and an "OK" button 84. After directly inputting an arbitrary name (such as "bar") into the component name input frame 82, the "OK" button 84 is clicked to give the name to the GUI component. Note, it may be possible to change the name of the GUI component at an arbitrary point of time.

Figure 6:
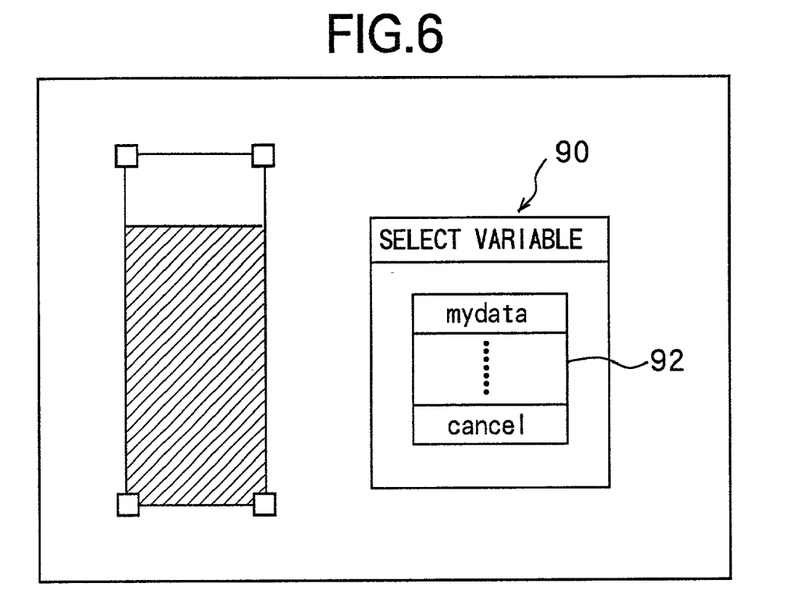
FIG. 6 is an explanatory view of a variable selecting screen.

When the name to the GUI component is given, a variable selecting screen 90 (i.e., specifying means) is displayed as shown in FIG. 6. Displayed on the variable selecting screen 90 is a list 92 of variable names created by previous procedures, to select a variable to be related with the GUI component from the listed variable names. Note, an option of "cancel" in the list is selected when no variables are used for a case where such a GUI component merely indicates an icon.

Figure 7:
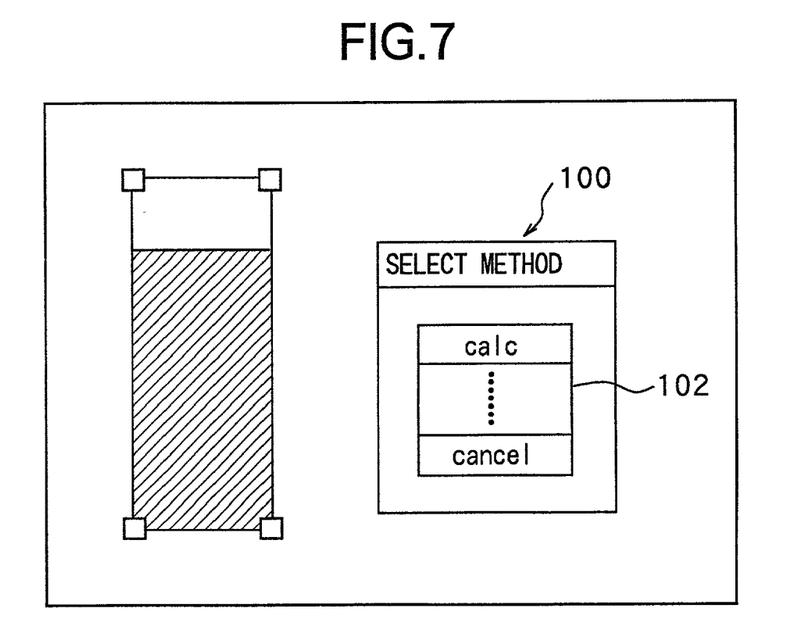
FIG. 7 is an explanatory view of a method selecting screen.

When a variable is selected, a method selecting screen 100 (specifying means) is displayed as shown in FIG. 7. Displayed on the method selecting screen 100 is a list 102 of method names created by previous procedures, to select a method for the GUI component from the listed method names. Note, an option of "cancel" in the list is selected when no methods are used for a case where such a GUI component merely indicates of an icon.

Herein, information concerning the GUI component as a result of respective operations is managed on the memory, in a table format with the variable name as a key. When the generation and attribute setting of GUI component and the selection of method are repeated, information concerning the GUI component is added onto the memory.

Figure 8:
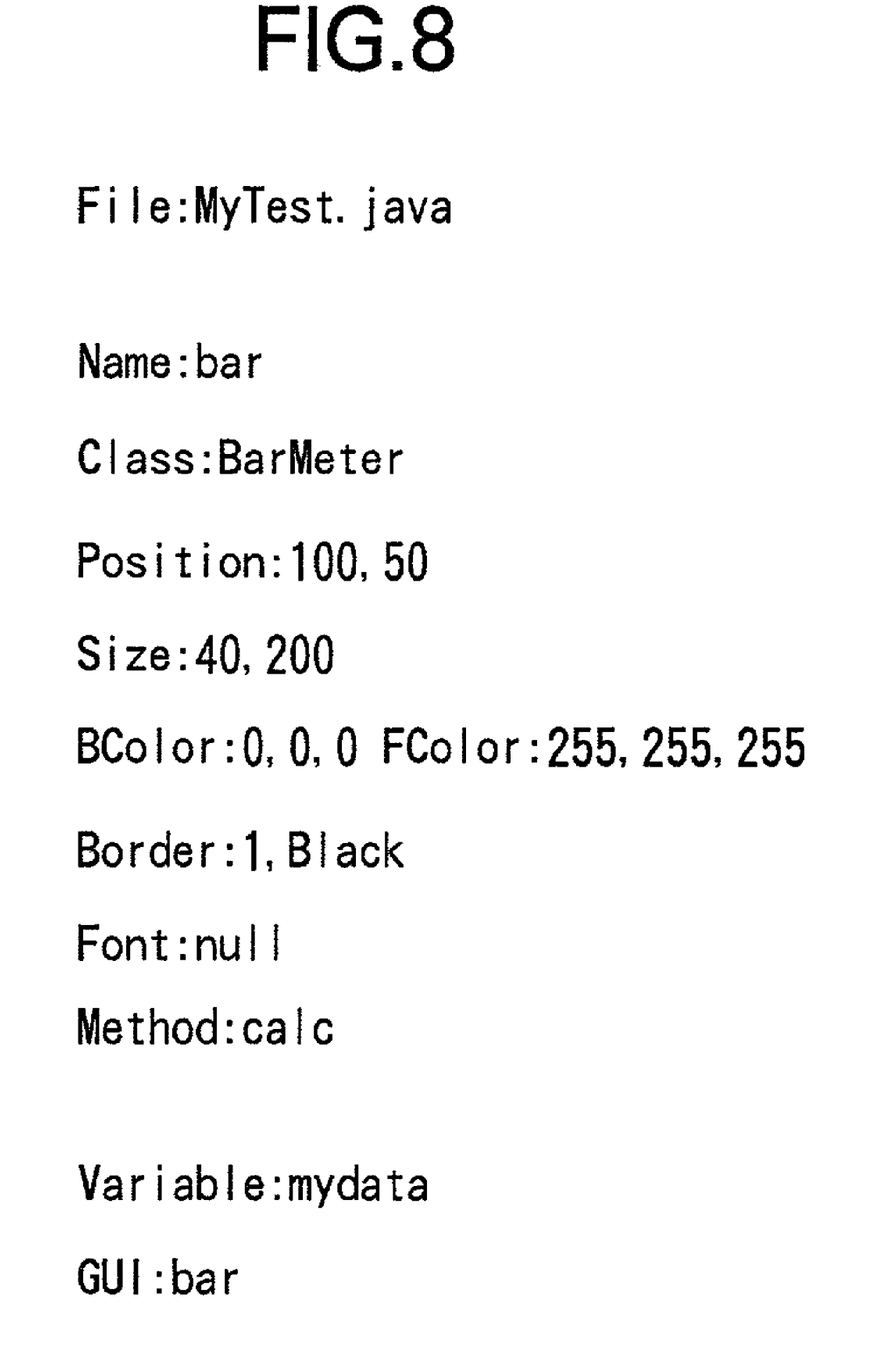
FIG. 8 is an explanatory view showing an example of a definition file.

Thereafter, to store the information concerning the GUI component as a definition in a file, a menu for activating a definition generating procedure is selected, for example. Then, a definition shown in FIG. 8 is created based on the on-memory information concerning the GUI component, and this definition is stored as the definition file 14 in the file storing device 10. Note, a name of the stored definition file 14 is held on the memory. Such a series of procedures corresponds to the file creating means.

Figure 9:
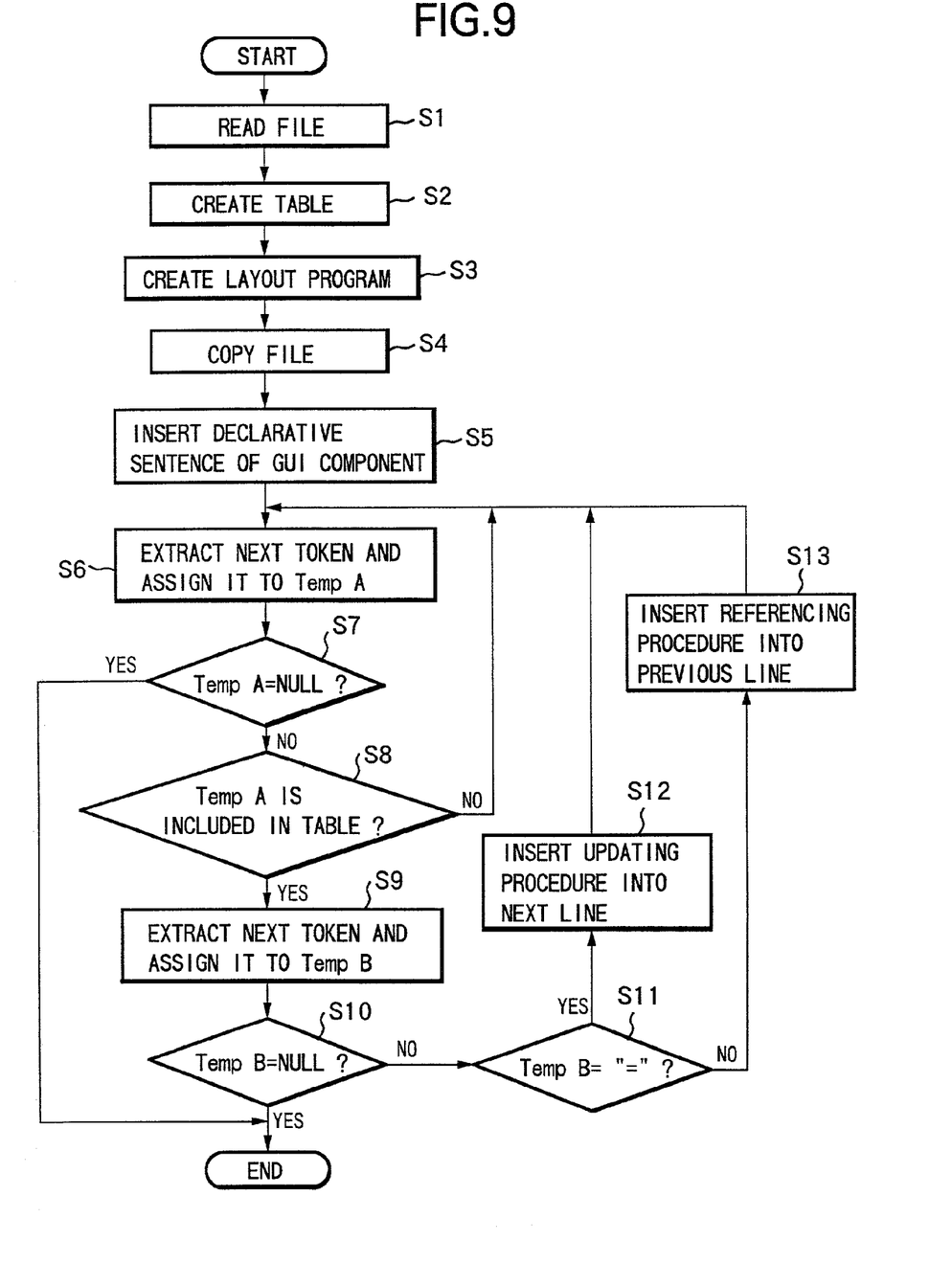
FIG. 9 is a flowchart showing a procedure for generating a source program.

(3) To Automatically Generate a Source Program and a Layout Program:

When activating the source program generating module 50, the procedures of the flowchart shown in FIG. 9 are started, to thereby automatically generate the layout program and source program which are to be compiled. The thus generated layout program and source program are stored as the layout program file 16 and source program file 18, in the file storing device 10. Such procedures will be detailed hereinafter.

At step 1 (abbreviated to "S1" in FIG. 9; and the same rule applies correspondingly to the following), the definition file 14 is read out from the file storing device 10. Note, although the read definition file 14 is specified by the definition file name held on the memory, it is possible to implement a function capable of selecting a desired definition file.

At step 2, a table of GUI component name with the variable name as a key is created, based on the definition file 14. In case of the definition file shown in FIG. 8, a table of "mydata:bar" is created, for example.

Figure 10:
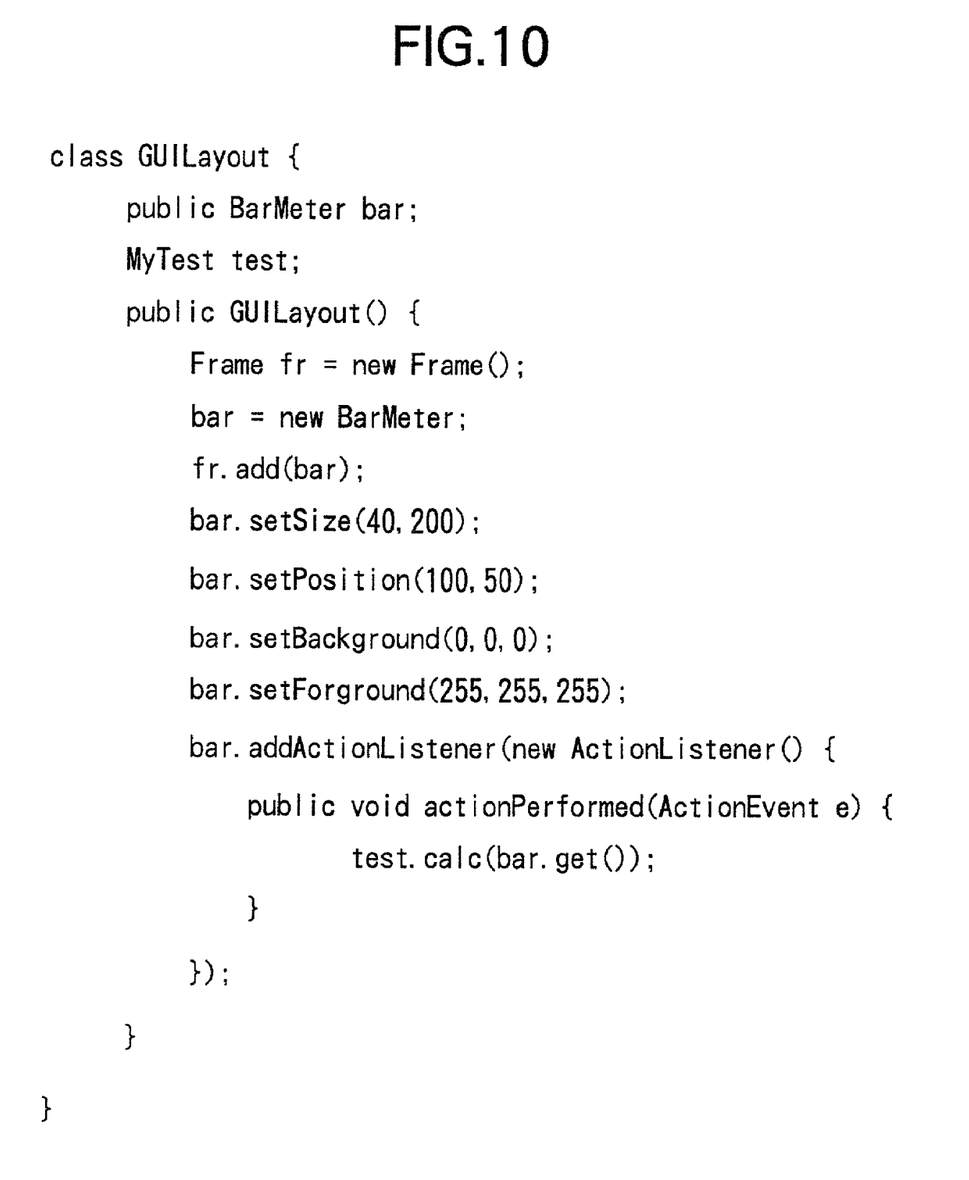
FIG. 10 is an explanatory view showing an example of a layout program.

At step 3, the layout program for performing the generation and attribute setting of the GUI component is generated. Namely, the layout program as shown in FIG. 10 is automatically generated, based on the second field 62 of the definition. Here, In the layout program, there is buried peculiarly not only programs concerning screen layout but also a method "calc" starting with "bar.addActionListener" for an execution event. Namely, when the GUI component is activated, the method "calc" is duly executed.

At step 4, the original source program file 12 is read out based on the source program file name held in the definition file 14, and a copy of the original source program file 12 (hereinafter called "copy file") is created.

At step 5, a declaration statement (such as "private BarMeter bar;" shown in FIG. 11) is inserted into the copy file, based on the GUI component name and class name held in the definition file 14.

At step 6, a file cursor in the original source program file 12 is moved to a next token, to extract the content of such a token. Namely, in the original source program file 12 shown in FIG. 3, at the time of starting the procedure, "class" is extracted, and "Mytest, {, . . . " are sequentially extracted, in the succeeding procedures. Then, the content of the extracted token is assigned to "tempA".

At step 7, it is judged whether or not tempA=NULL, i.e., whether or not it is the end of file. If tempA=NULL (Yes), the procedure is terminated. If tempA≠NULL (No), the procedure advances to step 8.

At step 8, it is judged whether or not tempA is in the table created at step 2. Namely, it is judged whether or not the token being currently analyzed is a process of variable. If tempA is in the table (Yes), the procedure advances to step 9. If not (No), the procedure goes back to step 6.

At step 9, the file cursor in the original source program file 12 is moved to a next token, to extract the content thereof. The extracted content of the next token is assigned to "tempB".

At step 10, it is judged whether or not tempB=NULL, i.e., whether or not it is the end of file. If tempB=NULL (Yes), the procedure is terminated. If tempB≠NULL (No), the procedure advances to step 11.

At step 11, it is judged whether or not tempB="=", i.e., whether or not the token next to the variable is an assignment operator. If tempB="=" (Yes), the procedure advances to step 12. If tempB≠"=" (No), the procedure advances to step 13. Note, although the assignment operator is "=" in this embodiment because of the assumption of Java, other assignment operator shall be of course applicable in case of adopting other language specification.

Figure 11:
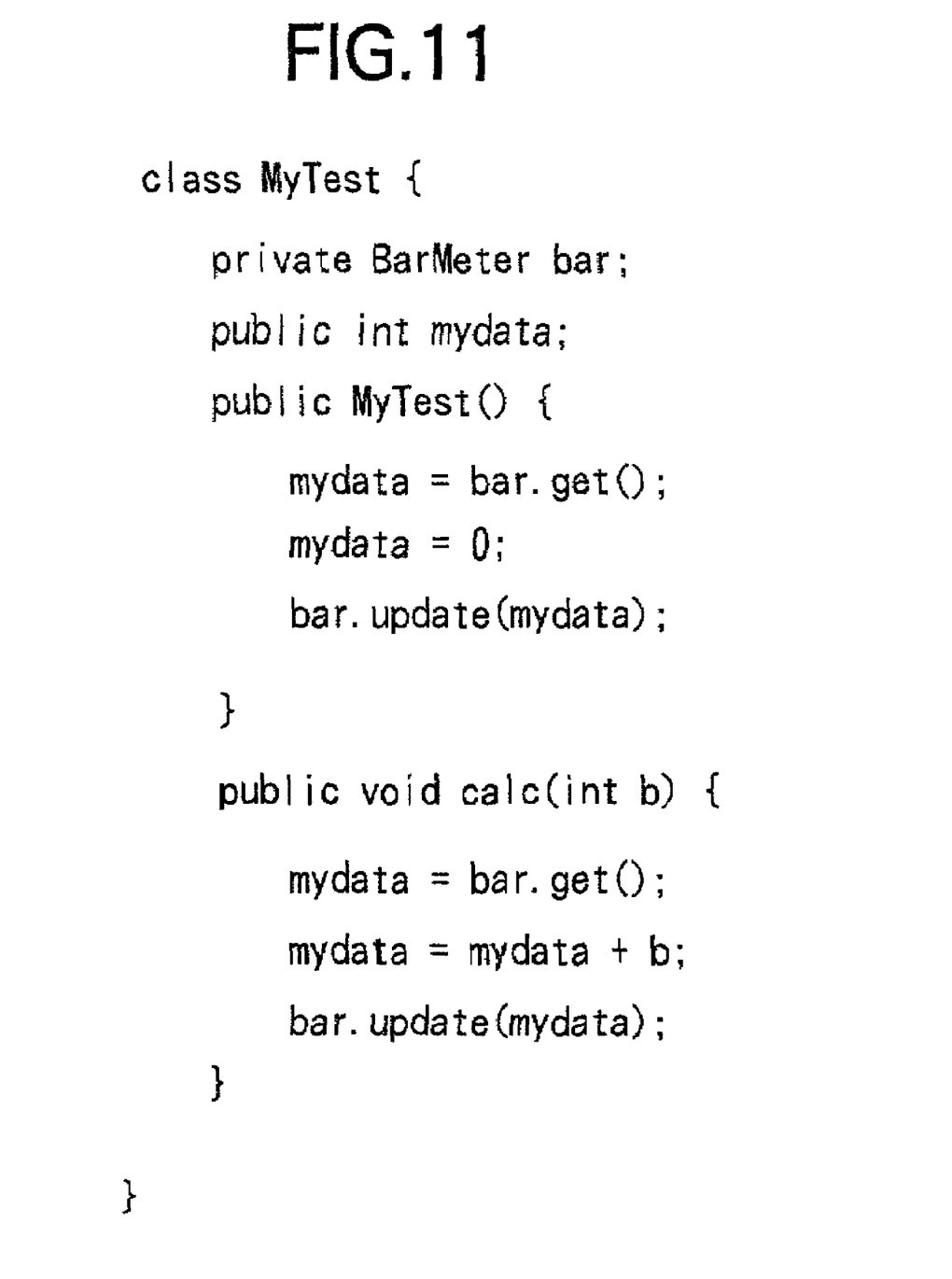
FIG. 11 is an explanatory view showing an example of a generated source program.

At step 12, the file cursor is advanced up to the end position of the variable assigning procedure, and a variable updating procedure is inserted into a next line of the variable assigning procedure in the copy file. Namely, the GUI component name (bar) for the variable name (mydata) is determined by referring to the table, and an updating procedure API "bar.update(mydata);" as shown in FIG. 11 is inserted into the next line of the variable assigning procedure.

Herein, an arrangement has been made to update variables, for example, by common API's (Application Programming Interface) irrespectively of the types of GUI components. Namely, in order to provide, as the following common API's:

Updating Procedure: void update(Object o)

note: Argument is an updated value;

Type Referencing Procedure: String getDataType( ); and

Value Referencing Procedure: Object get( ), there is provided the following interface, making use of the inheritance of Java as the object oriented language:

interface DataGUI { public void update(Object o);

public String getDataType( );

public Object get( );

}

By utilizing such an interface, there is added an API by the following class declaration, concerning "Button" which is the existing GUI component:

public DataGUIButton extends Button implements DataGUI { . . .

}

At step 13, a variable referencing procedure is inserted into a previous line of the variable assigning procedure in the copy file. Namely, the GUI component name (bar) for the variable name (mydata) is determined by referring to the table, and a referencing procedure API "mydata=bar.get( );" as shown in FIG. 11 is inserted into the previous line of the variable assigning procedure.

According to the procedures of steps 1 through 13 as described above, the layout program and the copy file are created, based on the definition file 14 created in the creating process of the screen layout. Then, the created copy file is inserted with the variable referencing procedure API and the variable updating procedure API, before and after the variable assigning procedure, respectively. Thus, in creating a GUI program, it becomes unnecessary to pay attention to the relation between a GUI component in a screen layout and a processing program for the GUI component, to thereby improve the productivity of the GUI program.

Further, when changing the screen layout, the screen layout creating module 30 is activated again, to replace a GUI component(s) or to change attribute(s) and the like of a GUI component(s). Then, a new definition reflecting the conducted replacement/change is created, and such a definition is overwritten onto the definition file 14 in the file storing device 10. Thereafter, if the source program generating module 50 is activated, the layout program file 16 and source program file 18 are generated again based on the thus overwritten definition file 14. In this case, it is unnecessary to amend the original source program file 12, unless the GUI components are added to the screen layout. Also from this standpoint, the productivity of GUI programs can be improved.

Although the above embodiment has utilized Java as the object oriented language, it is of course possible to apply the present invention even to other object oriented languages.

By recording a program for realizing such functions into a mobile recording medium such as a magnetic tape, magnetic disk, magnetic drum, IC card, and CD-ROM, the program creation supporting program according to the present invention can be distributed into the market. Further, those who have obtained such a program creation supporting program are possible to readily construct the program creation supporting apparatus according to the present invention, making use of a general computer system.

Industrial Applicability

As described above, the creation supporting apparatus and creation supporting method of GUI programs according to the present invention are extremely useful in that the apparatus and method are capable of improving the productivity of GUI programs. Further, the recording medium recorded with the creation supporting program of GUI programs according to the present invention is also extremely useful in that the same is capable of readily constructing the creation supporting apparatus of GUI programs, making use of a general computer system.

The invention claimed is:

1. A creation supporting apparatus of a graphical user interface program comprising:
    processing program creating means for creating a processing program for an individual object constituting a graphical user interface;
    screen layout creating means for creating a screen layout of said graphical user interface by arranging various objects;
    relating means for relating a variable and a method in said processing program, with the objects arranged in said screen layout; and
    program generating means for automatically generating, based on the relation between said variable and method, and the objects, another program in which said processing program is related with the objects.

2. A creation supporting apparatus of a graphical user interface program according to claim 1, wherein
    said relating means comprises:
    file name designating means for designating a file name of the processing program;
    extracting means for extracting a variable name and a method name from the processing program, based on the file name designated by said file name designating means;
    specifying means for specifying the variable name and method name extracted by said extracting means for each of the objects to be arranged in the screen layout when creating the screen layout by said screen layout creating means; and
    file creating means for creating a relation file described with a relation between the variable name and method name specified by said specifying means, and the objects.

3. A creation supporting apparatus of a graphical user interface program according to claim 2, wherein
    said program generating means generates a program by inserting an object referencing procedure and an object updating procedure into the processing program, based on the relation file created by said file creating means.

4. A creation supporting apparatus of a graphical user interface program according to claim 1, further comprising:
    layout program generating means for generating a screen layout program, based on the screen layout created by said screen layout creating means and based on the method and the objects related with each other by said relating means.

5. A creation supporting apparatus of a graphical user interface program according to claim 4, wherein
    said layout program generating means inserts a method execution procedure into said screen layout program.

6. A creation supporting method of a graphical user interface program, comprising:
    a processing program creating process for creating a processing program for an individual object constituting a graphical user interface;
    a screen layout creating process for creating a screen layout of said graphical user interface by arranging various objects;
    a relating process for relating a variable and a method in said processing program, with the objects arranged in said screen layout; and
    a program generating process for automatically generating, based on the relation between said variable and method, and the objects, another program in which said processing program is related with the objects.

7. A recording medium recorded with a creation supporting program of a graphical user interface program for realizing:
    a processing program creating function for creating a processing program for an individual object constituting a graphical user interface;
    a screen layout creating function for creating a screen layout of said graphical user interface by arranging various objects; a relating function for relating a variable and a method in said processing program, with the objects arranged in said screen layout; and
    a program generating function for automatically generating, based on the relation between said variable and method, and the objects, aanother program in which said processing program is related with the objects.

* * * * *